United States Patent
Wang

(10) Patent No.: US 10,951,818 B2
(45) Date of Patent: Mar. 16, 2021

(54) VIDEO ENCODING METHOD AND APPARATUS, DEVICE, AND STORAGE MEDIUM

(71) Applicant: TENCENT TECHNOLOGY (SHENZHEN) COMPANY LIMITED, Guangdong (CN)

(72) Inventor: Yao Wang, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 84 days.

(21) Appl. No.: 15/775,069

(22) PCT Filed: Nov. 23, 2016

(86) PCT No.: PCT/CN2016/107002
§ 371 (c)(1),
(2) Date: May 10, 2018

(87) PCT Pub. No.: WO2017/161907
PCT Pub. Date: Sep. 28, 2017

(65) Prior Publication Data
US 2018/0324355 A1    Nov. 8, 2018

(30) Foreign Application Priority Data
Mar. 22, 2016  (CN) .......................... 201610163645.6

(51) Int. Cl.
*H04N 5/232*    (2006.01)
*H04N 21/4402*  (2011.01)
(Continued)

(52) U.S. Cl.
CPC ....... *H04N 5/23238* (2013.01); *H04N 19/176* (2014.11); *H04N 19/46* (2014.11);
(Continued)

(58) Field of Classification Search
CPC .................................................. H04N 5/23238
(Continued)

(56) References Cited

U.S. PATENT DOCUMENTS

| 7,339,617 | B1 * | 3/2008 | Kondo | ............... H04N 5/23238 |
|---|---|---|---|---|
| | | | | 348/222.1 |
| 10,148,875 | B1 * | 12/2018 | Chen | .................... H04N 21/637 |

(Continued)

FOREIGN PATENT DOCUMENTS

| CN | 102342100 A | 2/2012 |
|---|---|---|
| CN | 102740154 A | 10/2012 |

(Continued)

OTHER PUBLICATIONS

Communication dated May 20, 2019, from the Korean Intellectual Property Office in the counterpart application No. 10-2018-7016288.

(Continued)

*Primary Examiner* — Jonathan R Messmore
*Assistant Examiner* — Asmamaw G Tarko
(74) *Attorney, Agent, or Firm* — Sughrue Mion, PLLC

(57) ABSTRACT

A method and apparatus are provided. The method includes obtaining a panoramic video formed by plural panoramic picture frames, each being formed to record a scenery of a viewing angle. The panoramic video is divided into N viewing angle video sequences, each sequence being formed by areas that are in the panoramic picture frames, that do not overlap with each other, and that have a same horizontal viewing angle. The sum of the viewing angles of the N video sequences is a total horizontal viewing angle of the panoramic picture frame, N being a positive integer. The N video sequences are respectively encoded to obtain N respective groups of encoded data, and a viewing angle is determined. A viewing angle video sequence whose viewing (Continued)

angle comprises the determined viewing angle is selected, and encoded data of the selected viewing angle video sequence is transmitted.

21 Claims, 8 Drawing Sheets

(51) Int. Cl.
| | |
|---|---|
| *H04N 21/2343* | (2011.01) |
| *H04N 21/6587* | (2011.01) |
| *H04N 21/81* | (2011.01) |
| *H04N 21/218* | (2011.01) |
| *H04N 21/2187* | (2011.01) |
| *H04N 19/46* | (2014.01) |
| *H04N 19/176* | (2014.01) |
| *H04N 19/597* | (2014.01) |

(52) U.S. Cl.
CPC ....... *H04N 19/597* (2014.11); *H04N 21/2187* (2013.01); *H04N 21/21805* (2013.01); *H04N 21/2343* (2013.01); *H04N 21/4402* (2013.01); *H04N 21/6587* (2013.01); *H04N 21/816* (2013.01)

(58) Field of Classification Search
USPC .......................................................... 348/36
See application file for complete search history.

(56) References Cited

U.S. PATENT DOCUMENTS

| 10,269,092 B2* | 4/2019 | Yoshimi | G06T 5/006 |
|---|---|---|---|
| 2004/0086186 A1* | 5/2004 | Kyusojin | H04N 7/181 |
| | | | 382/232 |
| 2004/0263636 A1* | 12/2004 | Cutler | H04N 7/15 |
| | | | 348/211.12 |
| 2010/0225735 A1* | 9/2010 | Shaffer | G06F 3/012 |
| | | | 348/14.08 |
| 2012/0262555 A1* | 10/2012 | Chien | H04N 21/44008 |
| | | | 348/51 |
| 2015/0153940 A1* | 6/2015 | Chien | H04N 21/44008 |
| | | | 715/720 |
| 2015/0346812 A1* | 12/2015 | Cole | H04N 19/597 |
| | | | 345/156 |
| 2016/0165309 A1* | 6/2016 | Van Brandenburg | H04N 21/4728 |
| | | | 725/116 |
| 2016/0182872 A1* | 6/2016 | Liu | H04N 13/349 |
| | | | 345/156 |
| 2016/0255322 A1* | 9/2016 | Kerofsky | G06F 3/04815 |
| | | | 348/51 |

FOREIGN PATENT DOCUMENTS

| CN | 105323552 A | 2/2016 |
|---|---|---|
| CN | 105791882 A | 7/2016 |
| JP | 2003199074 A | 7/2003 |
| JP | 2008225600 A | 9/2008 |
| KR | 1020130024357 A | 3/2013 |
| WO | 2015/054235 A1 | 4/2015 |
| WO | 2015134400 A1 | 9/2015 |

OTHER PUBLICATIONS

Written opinion of the International Searching Authority dated Feb. 9, 2017, in counterpart International Application No. PCT/CN2016/107002.
Communication dated Jun. 5, 2018, from the State Intellectual Property Office of People's Republic of China in counterpart Application No. 201610163645.6.
International Search Report for PCT/CN2016/107002, dated Feb. 9, 2017.
Communication dated Nov. 13, 2019 from the Korean Intellectual Property Office in application No. 10-2018-7016288.
Communication dated Oct. 15, 2019, from the Japanese Patent Office in application No. 2018-549490.
Communication dated Sep. 9, 2020, from the European Patent Office in European Application No. 16895252.1.

* cited by examiner

FIG. 1A
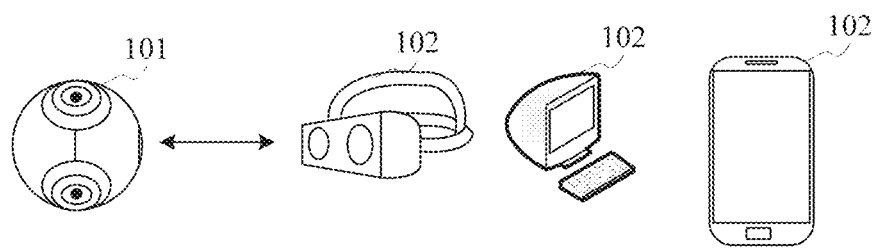
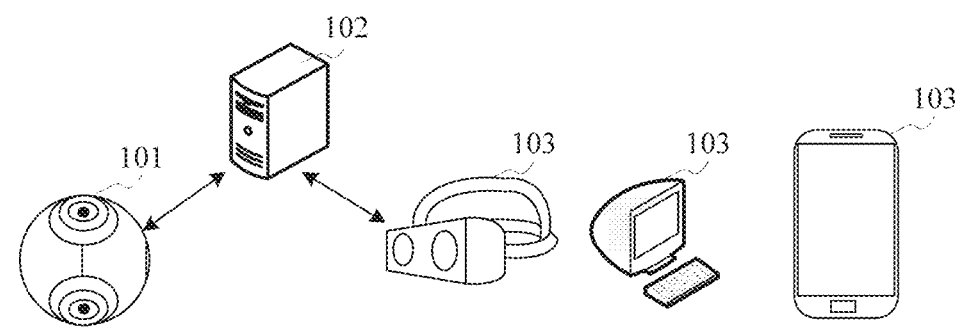
FIG. 1B

VIDEO ENCODING METHOD AND APPARATUS, DEVICE, AND STORAGE MEDIUM

CROSS-REFERENCE TO RELATED APPLICATIONS

This application is a National Stage entry of International Patent Application No. PCT/CN2016/107002, which claims priority from Chinese Patent Application No. 201610163645.6, filed on Mar. 22, 2016 in the State Intellectual Property Office of China, the disclosures of each of which are herein incorporated by reference in their entirety.

BACKGROUND

1. Field

The present disclosure relates to the field of encoding technologies, and in particular, to a video encoding method and apparatus, a device, and a storage medium.

2. Description of Related Art

A panoramic video is a video formed by a series of panoramic picture frames. A panoramic picture frame is a picture frame formed to record a scenery of a preset viewing angle. For example, the preset viewing angle may be horizontal 360° or vertical 180°, or the preset viewing angle may be horizontal 360°, vertical 270°, or the like. After obtaining a panoramic video by using a panoramic camera, the panoramic video is encoded by an encoder, and sent to a decoder for decoding, so that a user may view the panoramic video obtained after decoding.

In related art video encoding methods, all panoramic picture frames are encoded and decoded. However, a viewing angle of a user is usually around 150°; therefore, only encoded data of a viewing angle around 150° in a panoramic picture frame is effective, and remaining encoded data is ineffective. Receiving and decoding of the ineffective encoded data causes resource waste.

SUMMARY

It is an aspect to provide a video encoding method and apparatus, a device, and a storage medium that encodes panoramic video such that resource waste is reduced.

According to an aspect of one or more exemplary embodiments, there is provided a method. The method includes obtaining a panoramic video, the panoramic video being formed by plural panoramic picture frames, each of the panoramic picture frames being a picture frame formed to record a scenery of a viewing angle. The panoramic video is divided into N viewing angle video sequences, each viewing angle video sequence being formed by areas that are in the panoramic picture frames, that do not overlap with each other, and that have a same horizontal viewing angle. The sum of the horizontal viewing angles of the N viewing angle video sequences is a total horizontal viewing angle of the panoramic picture frame, N being a positive integer. The N viewing angle video sequences are respectively encoded to obtain N respective groups of encoded data, and a viewing angle is determined. A viewing angle video sequence whose horizontal viewing angle comprises the determined viewing angle is selected from among the N viewing angle video sequences, and encoded data of the selected viewing angle video sequence is transmitted.

According to other aspects of one or more exemplary embodiments, there are provided apparatuses, non-transitory computer readable storage media, devices, encoders, and other methods that are consistent with the above method.

BRIEF DESCRIPTION OF THE DRAWINGS

The above and/or other aspects will become more apparent to those of ordinary skill in the art by describing example embodiments thereof in detail with reference to the accompanying drawings, in which:

FIGS. 1A and 1B are diagrams of implementation environments of a video encoding method according to various exemplary embodiments;

DESCRIPTION OF EMBODIMENTS

Figure 2:
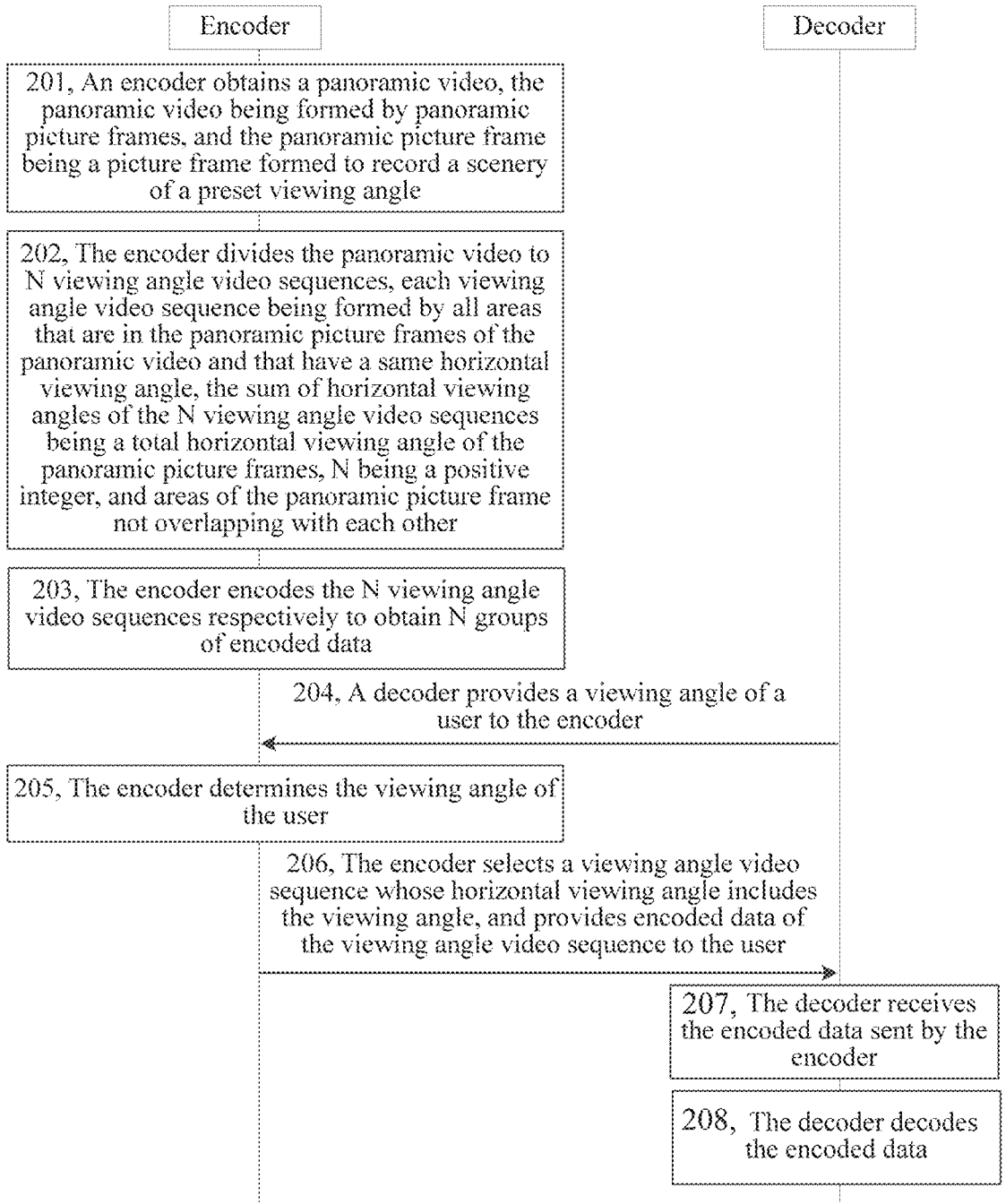
FIG. 2 is a method flowchart of a video encoding method according to an exemplary embodiment.

To make the objectives, technical solutions, and advantages of the present disclosure clearer, implementations of the present disclosure are described below in detail with reference to the accompanying drawings.

The related art provides a video encoding method that obtains, by an encoder, all panoramic picture frames in a panoramic video and encodes each panoramic picture frame according to a syntax structure defined in H.264/AVC (Advanced Video Coding) to obtain a macroblock set whose subscripts are continuous, or encodes each panoramic picture frame according to a syntax structure defined in H.265/HEVC (High Efficiency Video Coding) to obtain a rectangular area set that uses a block as a unit, and sends the encoded data corresponding to each panoramic picture frame to a decoder.

According to various exemplary embodiments described below, panoramic video is divided to N viewing angle video sequences, and the N viewing angle video sequences are encoded respectively, to obtain N groups of encoded data. A viewing angle of a user is determined. A viewing angle video sequence whose horizontal viewing angle includes the viewing angle is selected, and encoded data of the viewing angle video sequence is provided to the user. Therefore, only encoded data of a viewing angle video sequence within the viewing angle of the user may be provided, and transmission and decoding of encoded data of a viewing angle video sequence outside the viewing angle is avoided. This saves resources, and resolves the problem that receiving and decoding of all encoded data of a panoramic picture frame in a panoramic video causes resource waste.

FIGS. 1A and 1B are diagrams of implementation environments of a video encoding method according to various exemplary embodiments. FIG. 1A includes a panoramic camera 101 and a user equipment 102. In this case, an encoder is located in the panoramic camera 101, and a decoder is located in the user equipment 102. The user equipment 102 is not particularly limited and may be a virtual reality helmet, a television, a computer, a mobile phone, or the like as shown in FIG. 1A.

After the panoramic camera 101 shoots a panoramic video, the panoramic camera 101 divides the panoramic video to N viewing angle video sequences, and encodes each viewing angle video sequence by using the encoder, to obtain N groups of encoded data, and sends corresponding encoded data to the user equipment 102 according to a viewing angle of a user. The user equipment 102 decodes the encoded data by using the decoder, and plays a viewing angle video sequence obtained after decoding.

FIG. 1B includes a panoramic camera 101, a server 102, and a user equipment 103. In some exemplary embodiments, an encoder is located in the server 102, and a decoder is located in the user equipment 103. As in FIG. 1A, the user equipment 102 is not particularly limited and may be a virtual reality helmet, a television, a computer, a mobile phone, or the like as shown in FIG. 1B.

After the panoramic camera 101 shoots a panoramic video, the panoramic camera 101 sends the panoramic video to the server 102. The server 102 divides the panoramic video to N viewing angle video sequences, and encodes each viewing angle video sequence by using the encoder, to obtain N groups of encoded data, and sends corresponding encoded data to the user equipment 103 according to a viewing angle of a user. The user equipment 103 decodes the encoded data by using the decoder, and plays a viewing angle video sequence obtained after decoding.

In another exemplary embodiment, FIG. 1B includes a panoramic camera 101, a server 102, and a user equipment 103. In some exemplary embodiments, the encoder is located in the panoramic camera 101, and a decoder is located in the user equipment 103.

After the panoramic camera 101 shoots a panoramic video, the panoramic camera 101 divides the panoramic video to N viewing angle video sequences, and encodes each viewing angle video sequence by using the encoder, to obtain N groups of encoded data, and sends the N groups of encoded data to the server 102. The server 102 sends corresponding encoded data to the user equipment 103 according to a viewing angle of a user. The user equipment 103 decodes the encoded data by using the decoder, and plays a viewing angle video sequence obtained after decoding.

Referring to FIG. 2, FIG. 2 is a method flowchart of a video encoding method according to an exemplary embodiment. The video encoding method is applicable to the implementation environments shown in FIGS. 1A and 1B. The video encoding method includes:

Step 201: An encoder obtains a panoramic video, the panoramic video being formed by panoramic picture frames, and the panoramic picture frame being a picture frame formed to record a scenery of a preset viewing angle.

Step 202: The encoder divides the panoramic video to N viewing angle video sequences, each viewing angle video sequence being formed by all areas that are in the panoramic picture frames of the panoramic video and that have a same horizontal viewing angle, the sum of horizontal viewing angles of the N viewing angle video sequences being a total horizontal viewing angle of the panoramic picture frames, N being a positive integer, and areas of the panoramic picture frame not overlapping with each other.

Step 203: The encoder encodes the N viewing angle video sequences respectively to obtain N groups of encoded data.

Step 204: A decoder provides a viewing angle of a user to the encoder.

Step 205: The encoder determines the viewing angle of the user.

Step 206: The encoder selects a viewing angle video sequence whose horizontal viewing angle includes the viewing angle, and provides encoded data of the viewing angle video sequence to the user.

Step 207: The decoder receives the encoded data sent by the encoder.

Step 208: The decoder decodes the encoded data.

Steps 201, 202, 203, 205, and 206 may be independently performed as an exemplary embodiment on the encoder side, and steps 204, 207, and 208 may be independently performed as an exemplary embodiment on the decoder side.

In the video encoding method provided in the exemplary embodiment shown in FIGS. 1A-2, the panoramic video is divided to N viewing angle video sequences, and the N viewing angle video sequences are encoded respectively, to obtain N groups of encoded data. A viewing angle of a user is determined. A viewing angle video sequence whose horizontal viewing angle includes the viewing angle is selected, and encoded data of the viewing angle video sequence is provided to the user. Therefore, only encoded data of a viewing angle video sequence within the viewing angle of the user may be provided to the user, and transmission and decoding of encoded data of a viewing angle video sequence outside the viewing angle is avoided. This saves resources, and resolves the problem that receiving and decoding of all encoded data of a panoramic picture frame in a panoramic video causes resource waste.

Figure 3A:
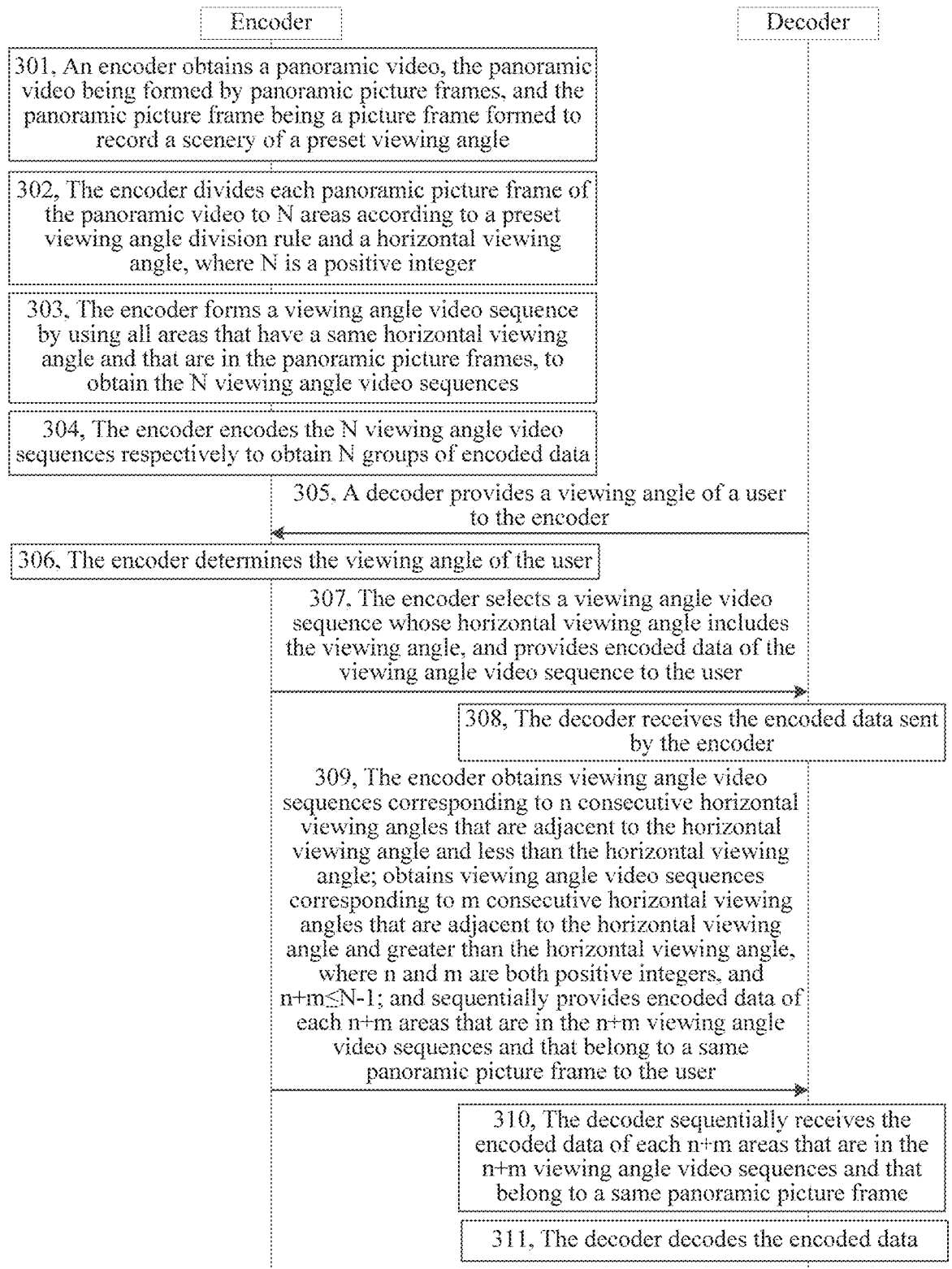
FIG. 3A is a method flowchart of a video encoding method according to another exemplary embodiment.
Figure 3B:
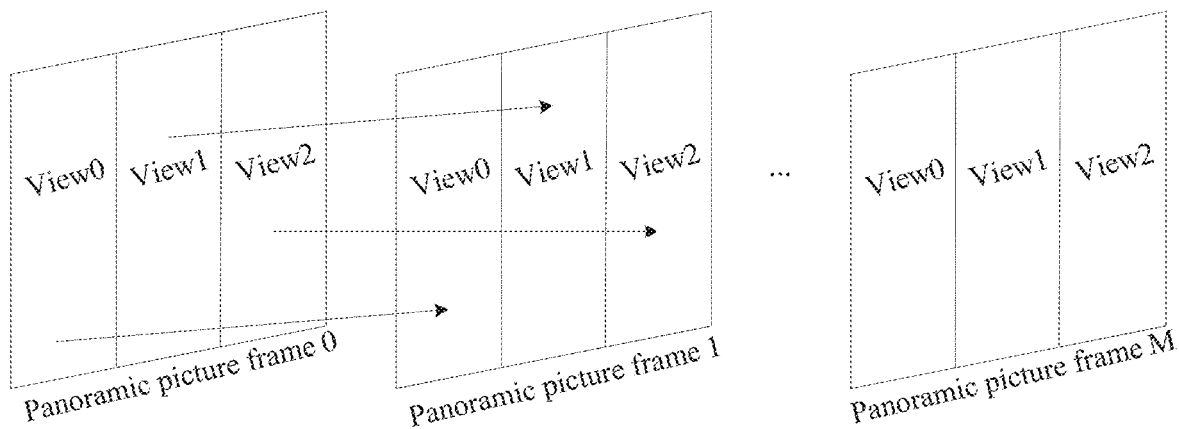
FIG. 3B is a schematic diagram of area division according to another exemplary embodiment.

Referring to FIG. 3A, FIG. 3A is a method flowchart of a video encoding method according to another exemplary embodiment. The video encoding method is applicable to the implementation environments shown in FIGS. 1A-1B. The video encoding method includes:

Step 301: An encoder obtains a panoramic video, the panoramic video being formed by panoramic picture frames, and the panoramic picture frame being a picture frame formed to record a scenery of a preset viewing angle.

For example, in exemplary embodiments in which the encoder is located in a panoramic camera, the panoramic camera first shoots a video by using cameras having different orientations, splices picture frames shot by all the cameras at a same moment, to obtain panoramic picture frames, form the panoramic video by using the panoramic picture frames, and provides the panoramic video to the encoder. In exemplary embodiments in which the encoder is located in a server, after the panoramic camera obtains the panoramic video by using the foregoing procedure, the panoramic camera sends the panoramic video to the server. The server provides the panoramic video to the encoder. A panoramic picture frame is a picture frame formed to record a scenery of a preset viewing angle. For example, the preset viewing angle may be horizontal 360° or vertical 180°, or the preset viewing angle may be horizontal 360°, vertical 270°, or the like.

Step 302: The encoder divides each panoramic picture frame of the panoramic video to N areas according to a preset viewing angle division rule and a horizontal viewing angle, where N is a positive integer.

For example, the viewing angle division rule is used to instruct the encoder to divide areas of a panoramic picture frame according to a horizontal viewing angle. All panoramic picture frames of a panoramic video have a same viewing angle division rule. The sum of horizontal viewing angles of the N viewing angle video sequences is a total horizontal viewing angle of the panoramic picture frames, and areas of a panoramic picture frame do not overlap with each other. For example, when the total horizontal viewing angle of the panoramic picture frames is 360°, the sum of the horizontal viewing angles of the N viewing angle video sequences is 360°.

In the exemplary embodiment shown in FIG. 3, interval ranges of horizontal viewing angles of areas of a panoramic picture frame may be the same or different. This is not limited in this exemplary embodiment. For example, the viewing angle division rule is division to 4 horizontal viewing angles on average. In this case, an interval range of each horizontal viewing angle is 90°, that is, 0° to 90° is used as a horizontal viewing angle, 90° to 180° is used as a horizontal viewing angle, 180° to 270° is used as a horizontal viewing angle, and 270° to 360° is used as a horizontal viewing angle. Alternatively, during implementation, the viewing angle division rule may be determined according to a viewing angle commonly used by the user, to improve accuracy of area division. For example, the viewing angle commonly used by the user may be 15° to 165°, or 150° total. In this case, the viewing angle division rule may use 0° to 15° as a horizontal viewing angle, may use 15° to 165° as a horizontal viewing angle, and may use 165° to 360° as a horizontal viewing angle. In other words, there may be three interval ranges in this case.

When areas are divided according to the viewing angle division rule, assuming that the viewing angle division rule is division to 3 horizontal viewing angles on average, for a panoramic picture frame 0, an area of the horizontal viewing angle 0° to 120° is used as view 0, an area of 120° to 240° is used as view 1, and an area of 240° to 360° is used as view 2; for a panoramic picture frame 1, an area of the horizontal viewing angle 0° to 120° is used as view 0, an area of 120° to 240° is used as view 1, and an area of 240° to 360° is used as view 2. By analogy, for a panoramic picture frame M, an area of the horizontal viewing angle 0° to 120° is used as view 0, an area of 120° to 240° is used as view 1, and an area of 240° to 360° is used as view 2. Refer to a schematic diagram of area division shown in FIG. 3B.

It should be noted that an area is formed by macroblocks. The macroblock is a unit in a video encoding algorithm, and the macroblock is formed by a luminance pixel block and two attached chrominance pixel blocks. Generally, the luminance pixel block is a pixel block having a size of 16×16, and the sizes of the two chrominance picture pixel blocks depend on a picture sampling format.

When an area includes at least two macroblocks, the macroblocks in the area depend on each other in a space domain. That is, in each area, encoded data of a macroblock is generated according to encoded data of a macroblock that is adjacent to the macroblock in a space domain.

For example, the encoder defines that a macroblock 1 and a macroblock 2 in F0V1 depend on each other. In this case, the macroblock 1 and the macroblock 2 are adjacent to each other in a space domain, and encoded data of the macroblock 1 is generated according to encoded data of the macroblock 2.

The encoder defines that macroblocks of different areas are independent from each other in a space domain. That is, encoded data of two macroblocks that are of different areas and that are adjacent in a space domain is irrelevant.

For example, the encoder defines that a macroblock 1 in F0V1 and a macroblock 2 in F0V2 do not depend on each other. In this case, the macroblock 1 and the macroblock 2 are adjacent to each other in a space domain, and encoded data of the macroblock 1 does not need to be generated according to encoded data of the macroblock 2.

Step 303: The encoder forms a viewing angle video sequence by using all areas that have a same horizontal viewing angle and that are in the panoramic picture frames, to obtain the N viewing angle video sequences.

Figure 3C:
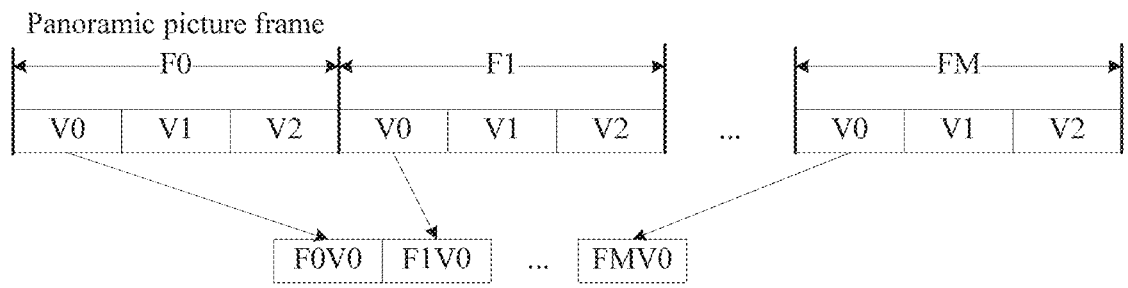
FIG. 3C is a schematic diagram of a viewing angle video sequence according to another exemplary embodiment.

For example, the foregoing example is still used for description. Refer to a schematic diagram of a viewing angle video sequence shown in FIG. 3C. In FIG. 3C, a panoramic picture frame is briefly indicated by F0, F1, . . . , FM, and an area is briefly indicated by V0, V1, V2, . . . , etc. In this case, areas whose horizontal viewing angles are 0° to 120° in M panoramic picture frames may be combined, to obtain a viewing angle video sequence F0V0, F1V0, . . . , and FMV0. Areas whose horizontal viewing angles are 120° to 240° in the M panoramic picture frames are combined, to obtain a viewing angle video sequence F0V1, F1V1, . . . , and FMV1. Areas whose horizontal viewing angles are 240° to 360° in the M panoramic picture frame are combined, to obtain a viewing angle video sequence F0V2, F1V2, . . . , and FMV2.

Areas in each viewing angle video sequence depend on each other in a time domain. That is, in each viewing angle video sequence, encoded data of a $j^{th}$ area is generated according to encoded data of a $(j-1)^{th}$ area; or encoded data of a $j^{th}$ area is generated according to encoded data of a $(j-1)^{th}$ area and encoded data of an $l^{th}$ area, where j and l are both positive integers, and $l>j≥2$.

For example, the encoder defines that F0V1 and F1V1 depend on each other. In this case, encoded data of F1V1 is generated according to encoded data of F0V1.

Areas in different viewing angle video sequences are independent from each other in a time domain. That is, encoded data of any two areas of different viewing angle video sequences are irrelevant in a time domain.

For example, the encoder defines that F0V1 and F1V2 do not depend on each other. In this case, encoded data of F1V2 does not need to be generated according to encoded data of F0V1.

Step 304: The encoder encodes the N viewing angle video sequences respectively to obtain N groups of encoded data.

For example, the encoder encodes each viewing angle video sequence to obtain a corresponding group of encoded data. For example, the encoder encodes the viewing angle video sequence F0V0, F1V0, . . . , and FMV0, to obtain a group of encoded data; encodes the viewing angle video sequence F0V1, F1V1, . . . , and FMV1, to obtain a group of encoded data; and encodes the viewing angle video sequence F0V2, F1V2, . . . , and FMV2, to obtain a group of encoded data.

It should be noted that, when the encoder provides encoded data of the panoramic video to multiple users, the encoder may obtain encoded data of all N viewing angle video sequences in advance, and provide encoded data of a corresponding viewing angle video sequence to the different users according to viewing angles of the different users. When the encoder provides encoded data of the panoramic video to only one user, the encoder may encode only a corresponding viewing angle video sequence according to a viewing angle of the user, and provide encoded data to the user, to save resources.

Step 305: A decoder provides a viewing angle of a user to the encoder.

For example, the decoder first obtains the viewing angle of the user, and sends the viewing angle to the encoder. The decoder may obtain a head rotation angle of the user according to an attitude sensor of a user equipment to obtain the viewing angle, or may obtain a viewing angle entered by the user. This is not limited in this exemplary embodiment.

Step 306: The encoder determines the viewing angle of the user.

For example, the encoder may obtain a default viewing angle, and determine the viewing angle as the viewing angle of the user. In this case, step 305 may not be performed. Alternatively, the encoder may receive the viewing angle sent by the decoder. In this case, step 305 is performed.

Step 307: The encoder selects a viewing angle video sequence whose horizontal viewing angle includes the viewing angle, and provides encoded data of the viewing angle video sequence to the user.

For example, the encoder may select only one horizontal viewing angle, and the horizontal viewing angle includes the viewing angle. For example, when the viewing angle of the user is 15° to 165°, if there is a viewing angle video sequence whose horizontal viewing angle is 15° to 165°, the viewing angle video sequence whose horizontal viewing angle is 15° to 165° may be selected. If there is no viewing angle video sequence whose horizontal viewing angle is 15° to 165°, and there is only a viewing angle video sequence whose horizontal viewing angle is 10° to 180°, the viewing angle video sequence whose horizontal viewing angle is 10° to 180° may be selected.

Alternatively, the encoder may select at least two neighboring horizontal viewing angles, and a horizontal viewing angle obtained by combining the at least two neighboring horizontal viewing angles includes the viewing angle. For example, when the viewing angle of the user is 15° to 165°, if there is a viewing angle video sequence whose horizontal viewing angle is 10° to 95° and a viewing angle video sequence whose horizontal viewing angle is 95° to 170°, the two viewing angle video sequences may be selected, and a horizontal viewing angle obtained after combination is 10° to 170° including the viewing angle 15° to 165°.

After the encoder determines the viewing angle video sequence, the encoder obtains encoded data corresponding to the viewing angle video sequence, and provides the encoded data to the user.

In this exemplary embodiment, the encoder may sequentially provide each group of encoded data to the user according to a chronological order of moments of generating encoded data. For example, the viewing angle video sequence is F0V0, F1V0, . . . , and FMV0, the encoder may provide encoded data of F0V0 to the user at a moment $T_0$, provide encoded data of F1V0 to the user at a moment $T_1$, . . . , and provide encoded data of FMV0 to the user at a moment $T_M$.

Step 308: The decoder receives the encoded data sent by the encoder.

For example, corresponding to the manner of sending the encoded data by the encoder, the decoder may sequentially receive encoded data of each area in the viewing angle video sequence according to the order of sending the encoded data.

For example, the viewing angle video sequence is F0V0, F1V0, . . . , and FMV0, and the decoder may receive encoded data of F0V0 at the moment $T_0$, receive encoded data of F1V0 at the moment $T_1$, . . . , and receive encoded data of FMV0 at the moment $T_M$.

Because the user may rotate the head in a watching process, the viewing angle changes. In this case, the encoder determines a changed viewing angle, and adjusts to-be-sent encoded data according to the changed viewing angle. Specifically, the video encoding method provided in this exemplary embodiment may further include:

1) if determining, at a moment $T_i$, that the viewing angle of the user changes, skip sending encoded data of an $i^{th}$ area in the viewing angle video sequence, where i is a positive integer;

2) selecting an updated viewing angle video sequence, and providing encoded data of an $i^{th}$ area in the updated viewing angle video sequence to the user, where the updated viewing angle video sequence is a viewing angle video sequence whose horizontal viewing angle matches the changed viewing angle; and 3) updating i to i+1, and cyclically performing the step of providing encoded data of an $i^{th}$ area in the updated viewing angle video sequence to the user at the moment $T_i$.

The moment $T_i$ is a moment at which the encoder determines that a watching time of the user changes. Because it needs to take time to notify the encoder that the viewing angle changes, an actual moment at which the viewing angle of the user changes may be earlier than the moment $T_i$, and may be a moment $T_{i-1}$, a moment $T_{i-2}$, or the like. This depends on a transmission delay of the notification. For example, the user adjusts the viewing angle at the moment $T_{i-1}$, and the decoder determines, at the moment $T_{i-1}$, that the viewing angle changes, and notifies this to the encoder. The encoder determines, at the moment $T_i$, that the viewing angle changes.

During actual implementation, it is assumed that the viewing angle video sequence determined at the moment $T_0$ according to the viewing angle of the user is F0V0, F1V0, . . . , and FMV0, and the encoder sequentially sends encoded data of each area. When the encoder determines, at the moment $T_3$, that the viewing angle of the user changes, and determines, according to the changed viewing angle, that an updated viewing angle video sequence is F0V1, F1V1, . . . , and FMV1, areas corresponding to encoded data sequentially sent are: F0V0, F1V0, F2V0, F3V1, F4V1, . . . , and FMV1.

In this exemplary embodiment, areas in each viewing angle video sequence depend on each other in a time domain. That is, decoding of a back area in the viewing angle video sequence depends on all front areas starting from an instantaneous decoding refresh (IDR) frame. When the viewing angle changes, the decoder receives only encoded data of one area in the updated viewing angle video sequence. Because decoding of the area depends on a front area, the encoder further sends encoded data of all front areas of the area to the decoder. To reduce time taken to transmit the front areas, to avoid the problem of playing freeze, the encoder may further predict a possible updated viewing angle video sequence that exists when the viewing angle changes, and send encoded data of the predicted updated viewing angle video sequence to the decoder.

Because the user usually slowly rotates the head to adjust the viewing angle, a viewing angle video sequence adjacent to the viewing angle video sequence selected in step 307 may be used as the predicted updated viewing angle video sequence. In this case, step 309 is performed.

Step 309: The encoder obtains viewing angle video sequences corresponding to n consecutive horizontal viewing angles that are adjacent to the horizontal viewing angle and less than the horizontal viewing angle; obtains viewing angle video sequences corresponding to m consecutive horizontal viewing angles that are adjacent to the horizontal viewing angle and greater than the horizontal viewing angle, where n and m are both positive integers, and n+m≤N−1; and sequentially provides encoded data of each n+m areas that are in the n+m viewing angle video sequences and that belong to a same panoramic picture frame to the user.

For example, it is assumed that horizontal viewing angles of 4 viewing angle video sequences are respectively 0° to 150, 150 to 165°, 165° to 180°, and 180° to 360°, and a viewing angle video sequence F0V1, F1V1, . . . , and FMV1 whose horizontal viewing angle is 15° to 165° is selected in step 307. In this case, it may be determined that a horizontal viewing angle that is less than 15° to 165° and adjacent to 15° to 165° is 0° to 150, and a viewing angle video sequence F0V0, F1V0, . . . , and FMV0 whose horizontal viewing angle is 0° to 150 is obtained. It may be further determined that a horizontal viewing angle that is greater than 15° to 165° and adjacent to 15° to 165° is 165° to 180°, and a viewing angle video sequence F0V2, F1V2, . . . , and FMV2 whose horizontal viewing angle is 165° to 180° is obtained.

After the n+m viewing angle video sequences are determined, the encoder may provide, at each moment, encoded data of n+m areas that are in the n+m viewing angle video sequences and that belong to a same panoramic picture frame to the user. For example, at the moment $T_0$, encoded data of n+m areas that belong to the panoramic picture frame 0 is provided to the user, that is, encoded data of F0V0 and F0V2. At the moment $T_1$, encoded data of n+m areas that belong to the panoramic picture frame 1 is provided to the user, that is, encoded data of F1V0 and F1V2; . . . ; and at the moment $T_M$, encoded data of n+m areas that belong to the panoramic picture frame M is provided to the user, that is, encoded data of FMV0 and FMV2.

It should be noted that, the encoder may provide both encoded data of the n+m viewing angle video sequences and encoded data in step 307 to the user, to avoid freeze during the viewing angle change. For example, encoded data of F0V0, F0V1, and F0V2 is provided to the user at the moment $T_0$, encoded data of F1V0, F1V1, and F1V2 is provided to the user at the moment $T_1$, . . . , and encoded data of FMV0, FMV1, and FMV2 is provided to the user at the moment $T_M$.

In this exemplary embodiment, if the encoder provides only encoded data of the viewing angle video sequence matching the viewing angle, few bandwidth resources are occupied for transmission. If the viewing angle of the user changes, the problem of playing freeze is caused because another viewing angle video sequence needs to be transmitted. If the encoder provides not only encoded data of the viewing angle video sequence matching the viewing angle, but also encoded data of the other n+m viewing angle video sequences, although more bandwidth resources are occupied for transmission, the buffered viewing angle video sequence may be immediately played when the viewing angle of the user changes, so that video playing is smoother.

When n+m<N−1, because not all encoded data of the panoramic video needs to be transmitted, bandwidth resources may be saved.

Figure 3D:
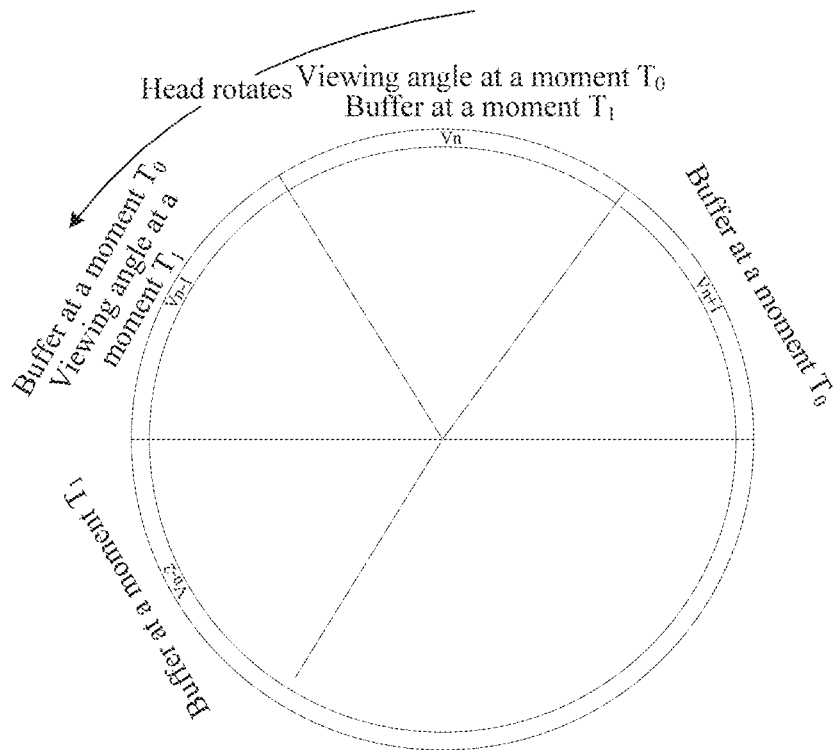
FIG. 3D is a schematic diagram of each area in a transmitted viewing angle video sequence according to another exemplary embodiment.

Refer to a schematic diagram of each area in a transmitted viewing angle video sequence shown in FIG. 3D. In FIG. 3D, a viewing angle video sequence corresponding to the viewing angle is $V_n$, and viewing angle video sequences buffered at the moment $T_0$ are $V_{n-1}$ and $V_{n+1}$. When the encoder determines, at the moment $T_1$, that the viewing angle of the user changes, the viewing angle video sequence corresponding to the viewing angle is $V_{n-1}$, and viewing angle video sequences buffered at the moment $T_1$ are $V_{n-2}$ and $V_n$.

Step 310: The decoder sequentially receives the encoded data of each n+m areas that are in the n+m viewing angle video sequences and that belong to a same panoramic picture frame.

For example, corresponding to the manner of sending the encoded data by the encoder, the decoder may sequentially receive the encoded data of each n+m areas that are in the n+m viewing angle video sequences and that belong to a same panoramic picture frame according to the order of sending the encoded data.

For example, the decoder may receive encoded data of F0V0 and F0V2 at the moment $T_0$, receive encoded data of F1V0 and F1V2 at the moment $T_1$, . . . , and receive encoded data of FMV0 and FMV2 at the moment $T_M$.

When the encoder provides both the encoded data of the n+m viewing angle video sequences and the encoded data in step 307 to the user, step 310 and step 308 may be combined. For example, the decoder may receive encoded data of F0V0, F0V1, and F0V2 at the moment To, receive encoded data of F1V0, F1V1, and F1V2 at the moment $T_1$, . . . , and receive encoded data of FMV0, FMV1, and FMV2 at the moment $T_M$.

Step 311: The decoder decodes the encoded data.

In this exemplary embodiment, after sequentially receiving the encoded data of each n+m areas that are in the n+m viewing angle video sequences and that belong to a same panoramic picture frame, the decoder processes the encoded data in two manners. The following separately describes the two processing manners.

First processing manner: decoding encoded data that is received at a current moment and that is of an area in a viewing angle video sequence whose horizontal viewing angle matches the viewing angle, and playing the obtained area; and buffering encoded data of n+m areas in the n+m viewing angle video sequences that is received at the current moment.

Because only encoded data of an area corresponding to the viewing angle needs to be decoded, and encoded data of another area is not decoded, resources may be saved. This processing manner is applicable to a scenario in which the viewing angle changes less frequently.

For example, the current moment is the moment $T_0$, and the area corresponding to the viewing angle is F0V1. In this case, the decoder decodes and plays encoded data of F0V1, and buffers encoded data of the areas of F0V0 and F0V2. In this case, because encoded data of the areas of F0V0 and F0V2 does not need to be decoded, resources may be saved.

If the decoder determines, at the moment $T_i$, that the viewing angle of the user changes, corresponding to the first processing manner, the decoder selects encoded data of an $i^{th}$ area in an updated viewing angle video sequence from the encoded data of the n+m areas that is buffered, decodes the encoded data, and plays the obtained $i^{th}$ area.

For example, a viewing angle video sequence corresponding to the viewing angle is V2 at the moment $T_0$. In this case, the decoder receives encoded data of F0V1, F0V2, and F0V3, and plays F0V2. At the moment $T_1$, the decoder determines that the viewing angle of the user changes. Because the encoder does not know, at this moment, that the viewing angle of the user changes, the encoder transmits encoded data of F1V1, F1V2, and F1V3. In this case, the decoder receives the encoded data of F1V1, F1V2, and F1V3. Because decoding of F1V1 depends on F0V1, the decoder may first decode the encoded data of F0V1, decode encoded data of F1V1 according to the obtained F0V1, and play the obtained F1V1. At the moment $T_2$, the encoder determines that the viewing angle of the user changes, and transmits encoded data of F2V0, F2V1, and F2V2. In this case, the decoder receives the encoded data of F2V0, F2V1, and F2V2, decodes encoded data of F2V1 according to F1V1 previously obtained by decoding, and plays the obtained F2V1, and so on.

Second processing manner: decoding encoded data that is received at a current moment and that is of an area in a viewing angle video sequence whose horizontal viewing angle matches the viewing angle, and playing the obtained area; and decoding encoded data of n+m areas in the n+m viewing angle video sequences that is received at the current moment, and buffering the obtained n+m areas.

For example, the current moment is the moment $T_0$, and the area corresponding to the viewing angle is F0V1. In this case, the decoder decodes and plays encoded data of F0V1, and decodes and buffers encoded data of F0V0 and F0V2.

If the viewing angle of the user changes at the moment $T_j$, corresponding to the second processing manner, the decoder selects an $i^{th}$ area in the updated viewing angle video sequence from the buffered n+m areas, and plays the $i^h$ area.

For example, a viewing angle video sequence corresponding to the viewing angle is V2 at the moment $T_0$. In this case, the decoder receives and decodes encoded data of F0V1, F0V2, and F0V3, and plays F0V2. At the moment $T_1$, the decoder determines that the viewing angle of the user changes. Because the encoder does not know, at this moment, that the viewing angle of the user changes, the encoder transmits encoded data of F1V1, F1V2, and F1V3. In this case, the decoder receives the encoded data of F1V1, F1V2, and F1V3. Because decoding of F1V1 depends on F0V1 and F0V1 has been obtained by decoding, the decoder may directly decode the encoded data of F V1 according to F0V1 and play the obtained F V1. At the moment $T_2$, the encoder determines that the viewing angle of the user changes, and transmits encoded data of F2V0, F2V1, and F2V2. In this case, the decoder receives the encoded data of F2V0, F2V1, and F2V2, decodes encoded data of F2V1 according to F1V1, and plays the obtained F2V1, and so on.

Because it is advantageous that encoded data of all areas be decoded in real time so that playing is smoother, this implementation is applicable to a scenario in which the viewing angle changes more frequently.

Steps 301, 302, 303, 304, 306, 307, and 309 may be independently performed as an exemplary embodiment on the encoder side, and steps 305, 308, 310, and 311 may be independently performed as an exemplary embodiment on the decoder side.

Figure 3E:
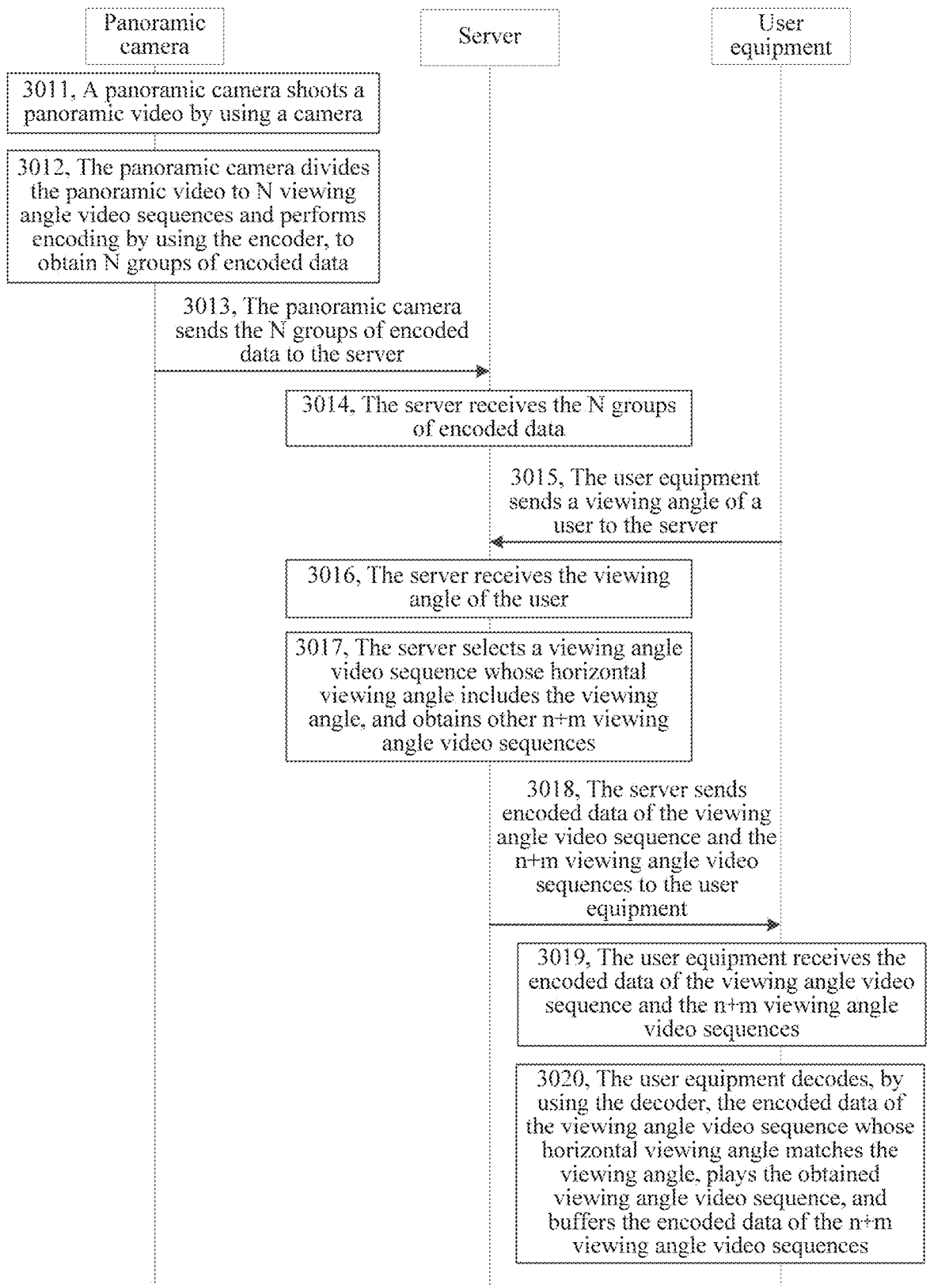
FIG. 3E is a schematic diagram of a video encoding method according to another exemplary embodiment.

For ease of understanding, in the exemplary embodiment shown in FIG. 3E, description is provided by using an example in which an encoder is located in a panoramic camera, a decoder is located in a user equipment, and there is a server. Refer to a schematic diagram of a video encoding method shown in FIG. 3E. A specific implementation process thereof is as follows:

Step 3011: A panoramic camera shoots a panoramic video by using a camera.

Step 3012: The panoramic camera divides the panoramic video to N viewing angle video sequences and performs encoding by using the encoder, to obtain N groups of encoded data.

Step 3013: The panoramic camera sends the N groups of encoded data to the server.

Step 3014: The server receives the N groups of encoded data.

Step 3015: The user equipment sends a viewing angle of a user to the server.

Step 3016: The server receives the viewing angle of the user.

Step 3017: The server selects a viewing angle video sequence whose horizontal viewing angle includes the viewing angle, and obtains other n+m viewing angle video sequences.

For details of a process of obtaining the n+m viewing angle video sequences, refer to the description in step 309 above.

Step 3018: The server sends encoded data of the viewing angle video sequence and the n+m viewing angle video sequences to the user equipment.

Step 3019: The user equipment receives the encoded data of the viewing angle video sequence and the n+m viewing angle video sequences.

Step 3020: The user equipment decodes, by using the decoder, the encoded data of the viewing angle video sequence whose horizontal viewing angle matches the viewing angle, plays the obtained viewing angle video sequence, and buffers the encoded data of the n+m viewing angle video sequences.

In the video encoding method provided in this exemplary embodiment, the panoramic video is divided to N viewing angle video sequences, and the N viewing angle video sequences are encoded respectively, to obtain N groups of encoded data. A viewing angle of a user is determined. A viewing angle video sequence whose horizontal viewing angle includes the viewing angle is selected, and encoded data of the viewing angle video sequence is provided to the user. Therefore, only encoded data of a viewing angle video sequence within the viewing angle of the user may be provided to the user, and transmission and decoding of encoded data of a viewing angle video sequence outside the viewing angle is avoided. This saves resources, and resolves the problem that receiving and decoding of all encoded data of a panoramic picture frame in a panoramic video causes resource waste.

Moreover, viewing angle video sequences corresponding to n consecutive horizontal viewing angles that are adjacent to the horizontal viewing angle and less than the horizontal viewing angle are obtained. Viewing angle video sequences corresponding to m consecutive horizontal viewing angles that are adjacent to the horizontal viewing angle and greater than the horizontal viewing angle are obtained. Encoded data of each n+m areas that are in the n+m viewing angle video sequences and that belong to a same panoramic picture frame is sequentially provided to the user. Therefore, encoded data of a viewing angle video sequence whose horizontal viewing angle is adjacent to the viewing angle may be provided to the user. In this way, when the viewing angle changes, the decoder may immediately obtain corresponding encoded data from the buffered encoded data. This implements smoother video playing, and resolves the problem of playing freeze caused by that when the viewing angle changes, the encoder needs to send encoded data of the viewing angle video sequence whose horizontal viewing angle matches the changed viewing angle to the decoder.

Figure 4:
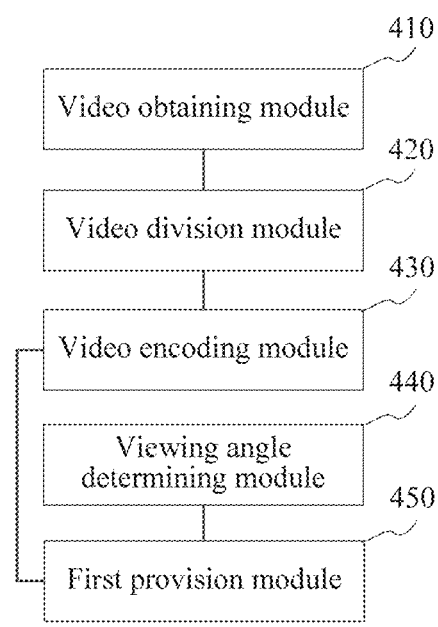
FIG. 4 is a structural block diagram of a video encoding apparatus according to an exemplary embodiment.

Referring to FIG. 4, FIG. 4 is a structural block diagram of a video encoding apparatus according to an exemplary embodiment. The video encoding method is applicable to the implementation environments shown in FIGS. 1A-1B. The video encoding apparatus includes:

a video obtaining module 410, configured to obtain a panoramic video, the panoramic video being formed by panoramic picture frames, and the panoramic picture frame being a picture frame formed to record a scenery of a preset viewing angle;

a video division module 420, configured to divide the panoramic video obtained by the video obtaining module 410 to N viewing angle video sequences, each viewing angle video sequence being formed by all areas that are in the panoramic picture frames of the panoramic video and that have a same horizontal viewing angle, the sum of horizontal viewing angles of the N viewing angle video sequences being a total horizontal viewing angle of the panoramic picture frames, N being a positive integer, and areas of the panoramic picture frame not overlapping with each other;

a video encoding module 430, configured to encode the N viewing angle video sequences obtained by the video division module 420 respectively to obtain N groups of encoded data;

a viewing angle determining module 440, configured to determine a viewing angle of a user; and a first provision module 450, configured to: select a viewing angle video sequence whose horizontal viewing angle includes the viewing angle determined by the viewing angle determining module 440, and provide encoded data of the viewing angle video sequence to the user.

In the video encoding apparatus provided in this exemplary embodiment, the panoramic video is divided to N viewing angle video sequences, and the N viewing angle video sequences are encoded respectively, to obtain N groups of encoded data. A viewing angle of a user is determined. A viewing angle video sequence whose horizontal viewing angle includes the viewing angle is selected, and encoded data of the viewing angle video sequence is provided to the user. Therefore, only encoded data of a viewing angle video sequence within the viewing angle of the user may be provided to the user, and transmission and decoding of encoded data of a viewing angle video sequence outside the viewing angle is avoided. This saves resources, and resolves the problem that receiving and decoding of all encoded data of a panoramic picture frame in a panoramic video causes resource waste.

Figure 5:
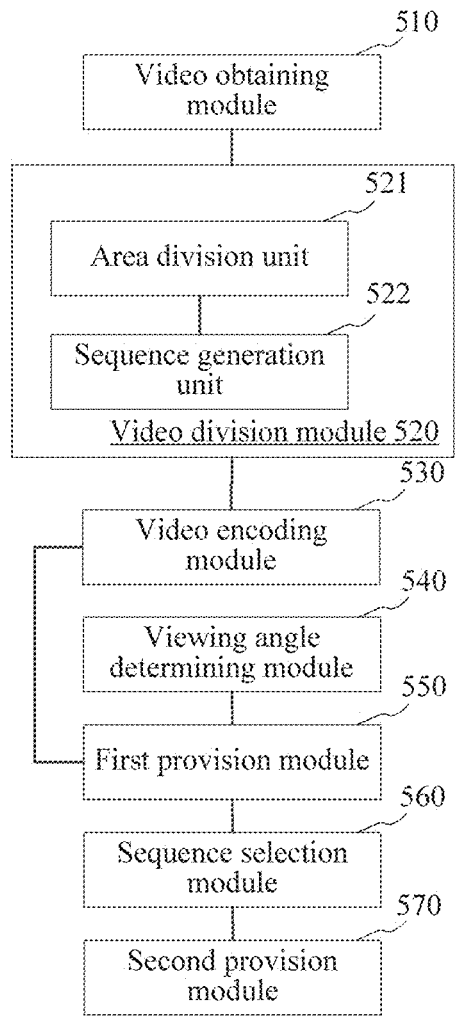
FIG. 5 is a structural block diagram of a video encoding apparatus according to another exemplary embodiment.

Referring to FIG. 5, FIG. 5 is a structural block diagram of a video encoding apparatus according to another exemplary embodiment. The video encoding method is applicable to the implementation environments shown in FIG. 1A-1B. The video encoding apparatus includes:

a video obtaining module 510, configured to obtain a panoramic video, the panoramic video being formed by panoramic picture frames, and the panoramic picture frame being a picture frame formed to record a scenery of a preset viewing angle;

a video division module 520, configured to divide the panoramic video obtained by the video obtaining module 510 to N viewing angle video sequences, each viewing angle video sequence being formed by all areas that are in the panoramic picture frames of the panoramic video and that have a same horizontal viewing angle, the sum of horizontal viewing angles of the N viewing angle video sequences being a total horizontal viewing angle of the panoramic picture frames, N being a positive integer, and areas of the panoramic picture frame not overlapping with each other;

a video encoding module 530, configured to encode the N viewing angle video sequences obtained by the video division module 520 respectively to obtain N groups of encoded data;

a viewing angle determining module 540, configured to determine a viewing angle of a user; and a first provision module 550, configured to: select a viewing angle video sequence whose horizontal viewing angle includes the viewing angle determined by the viewing angle determining module 540, and provide encoded data of the viewing angle video sequence to the user.

In another exemplary embodiment, the video division module 520 includes:

an area division unit 521, configured to divide each panoramic picture frame of the panoramic video to N areas according to a preset viewing angle division rule and a horizontal viewing angle; and a sequence generation unit 522, configured to form a viewing angle video sequence by using all areas that have a same horizontal viewing angle and that are in the panoramic picture frames divided by the area division unit 521, to obtain the N viewing angle video sequences.

In another exemplary embodiment, the first provision module 550 is further configured to: if determining, at a moment $T_i$, that the viewing angle of the user changes, skip sending encoded data of an $i^{th}$ area in the viewing angle video sequence, where i is a positive integer;

select an updated viewing angle video sequence, and provide encoded data of an $i^{th}$ area in the updated viewing angle video sequence to the user, where the updated viewing angle video sequence is a viewing angle video sequence whose horizontal viewing angle matches the changed viewing angle; and update i to i+1, and cyclically perform the step of providing encoded data of an $i^{th}$ area in the updated viewing angle video sequence to the user at the moment $T_i$.

In another exemplary embodiment, the video encoding apparatus provided in this exemplary embodiment further includes:

a sequence selection module 560, configured to: after the first provision module 550 selects the viewing angle video sequence whose horizontal viewing angle matches the viewing angle, obtain viewing angle video sequences corresponding to n consecutive horizontal viewing angles that are adjacent to the horizontal viewing angle and less than the horizontal viewing angle; and obtain viewing angle video sequences corresponding to m consecutive horizontal viewing angles that are adjacent to the horizontal viewing angle and greater than the horizontal viewing angle, where n and m are both positive integers, and n+m≤N−1; and a second provision module 570, configured to sequentially provide encoded data of each n+m areas that are in the n+m viewing angle video sequences selected by the sequence selection module 560 and that belong to a same panoramic picture frame to the user.

In another exemplary embodiment, in each viewing angle video sequence, encoded data of a $j^{th}$ area is generated according to encoded data of a $(j-1)^{th}$ area; or encoded data of a j area is generated according to encoded data of a $(j-1)^{th}$ area and encoded data of an $l^{th}$ area, where j and l are both positive integers, and l>j≥2; and encoded data of any two areas of different viewing angle video sequences are irrelevant in a time domain.

In another exemplary embodiment, when the area includes at least two macroblocks, in each area, encoded data of a macroblock is generated according to encoded data of a macroblock that is adjacent to the macroblock in a space domain; and encoded data of two macroblocks that are of different areas and that are adjacent in a space domain is irrelevant.

In the video encoding apparatus provided in this exemplary embodiment, the panoramic video is divided to N viewing angle video sequences, and the N viewing angle video sequences are encoded respectively, to obtain N groups of encoded data. A viewing angle of a user is determined. A viewing angle video sequence whose horizontal viewing angle includes the viewing angle is selected, and encoded data of the viewing angle video sequence is provided to the user. Therefore, only encoded data of a viewing angle video sequence within the viewing angle of the user may be provided to the user, and transmission and decoding of encoded data of a viewing angle video sequence outside the viewing angle is avoided. This saves resources, and resolves the problem that receiving and decoding of all encoded data of a panoramic picture frame in a panoramic video causes resource waste.

Moreover, viewing angle video sequences corresponding to n consecutive horizontal viewing angles that are adjacent to the horizontal viewing angle and less than the horizontal viewing angle are obtained. Viewing angle video sequences corresponding to m consecutive horizontal viewing angles that are adjacent to the horizontal viewing angle and greater than the horizontal viewing angle are obtained. Encoded data of each n+m areas that are in the n+m viewing angle video sequences and that belong to a same panoramic picture frame is sequentially provided to the user. Therefore, encoded data of a viewing angle video sequence whose horizontal viewing angle is adjacent to the viewing angle may be provided to the user. In this way, when the viewing angle changes, the decoder may immediately obtain corresponding encoded data from the buffered encoded data. This implements smoother video playing, and resolves the problem of playing freeze caused by that when the viewing angle changes, the encoder needs to send encoded data of the viewing angle video sequence whose horizontal viewing angle matches the changed viewing angle to the decoder.

Figure 6:
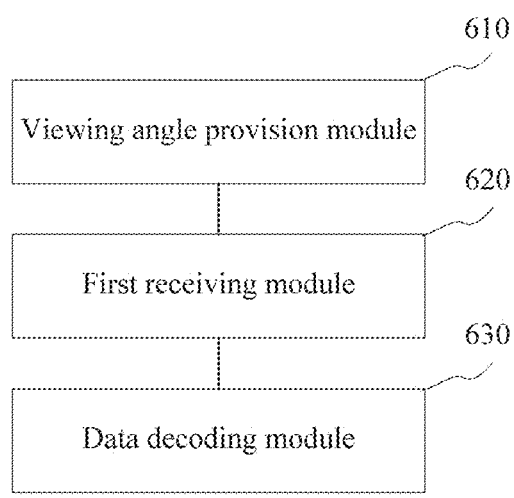
FIG. 6 is a structural block diagram of a video encoding apparatus according to an exemplary embodiment.

Referring to FIG. 6, FIG. 6 is a structural block diagram of a video decoding apparatus according to an exemplary embodiment. The video decoding method is applicable to the implementation environments shown in FIG. 1A-1B. The video decoding apparatus includes:

a viewing angle provision module 610, configured to provide a viewing angle of a user to an encoder, the encoder being configured to obtain a panoramic video, the panoramic video being formed by a panoramic picture frames, and the panoramic picture frame being a picture frame formed to record a scenery of a preset viewing angle; dividing the panoramic video to N viewing angle video sequences; encoding the N viewing angle video sequences respectively to obtain N groups of encoded data; and selecting a viewing angle video sequence whose horizontal viewing angle includes the viewing angle, and providing encoded data of the viewing angle video sequence to the user, each viewing angle video sequence being formed by all areas that are in the panoramic picture frames of the panoramic video and that have a same horizontal viewing angle, the sum of horizontal viewing angles of the N viewing angle video sequences being a total horizontal viewing angle of the panoramic picture frames, N being a positive integer, and areas of the panoramic picture frame not overlapping with each other;

a first receiving module 620, configured to receive the encoded data sent by the encoder; and a data decoding module 630, configured to decode the encoded data received by the first receiving module 620.

In the video decoding apparatus provided in this exemplary embodiment, the viewing angle of the user is provided to the encoder, so that the encoder divides the panoramic video to N viewing angle video sequences, and encodes the N viewing angle video sequences respectively, to obtain N groups of encoded data. A viewing angle video sequence whose horizontal viewing angle includes the viewing angle is selected, and encoded data of the viewing angle video sequence is provided to the user. Transmission and decoding of encoded data of a viewing angle video sequence outside the viewing angle is avoided. This saves resources, and resolves the problem that receiving and decoding of all encoded data of a panoramic picture frame in a panoramic video causes resource waste.

Figure 7:
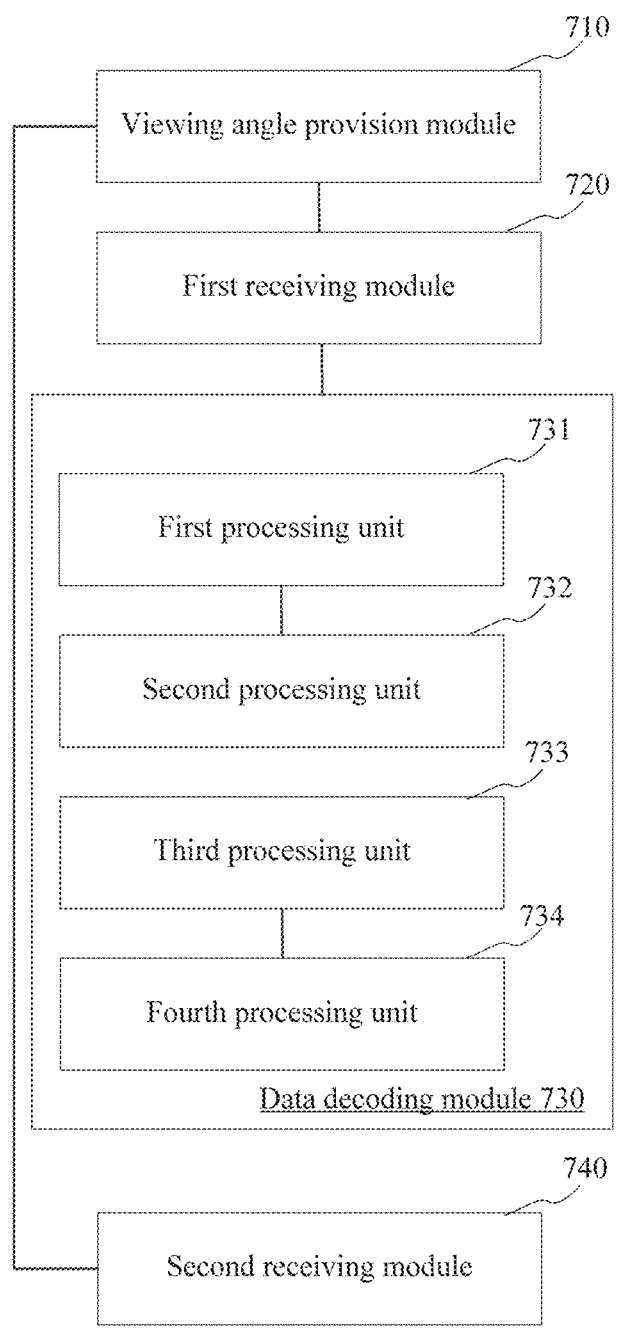
FIG. 7 is a structural block diagram of a video encoding apparatus according to another exemplary embodiment.

Referring to FIG. 7, FIG. 7 is a structural block diagram of a video decoding apparatus according to another exemplary embodiment. The video decoding method is applicable to the implementation environments shown in FIG. 1A-1B. The video decoding apparatus includes:

a viewing angle provision module 710, configured to provide a viewing angle of a user to an encoder, the encoder being configured to obtain a panoramic video, the panoramic video being formed by a panoramic picture frames, and the panoramic picture frame being a picture frame formed to record a scenery of a preset viewing angle; dividing the panoramic video to N viewing angle video sequences; encoding the N viewing angle video sequences respectively to obtain N groups of encoded data; and selecting a viewing angle video sequence whose horizontal viewing angle includes the viewing angle, and providing encoded data of the viewing angle video sequence to the user, each viewing angle video sequence being formed by all areas that are in the panoramic picture frames of the panoramic video and that have a same horizontal viewing angle, the sum of horizontal viewing angles of the N viewing angle video sequences being a total horizontal viewing angle of the panoramic picture frames, N being a positive integer, and areas of the panoramic picture frame not overlapping with each other;

a first receiving module 720, configured to receive the encoded data sent by the encoder; and a data decoding module 730, configured to decode the encoded data received by the first receiving module 720.

In another exemplary embodiment, the video decoding apparatus provided in this exemplary embodiment further includes:

a second receiving module 740, configured to sequentially receive each n+m pieces of encoded data that are in n+m viewing angle video sequences and that belong to a same panoramic picture frame, where the n+m viewing angle video sequences are viewing angle video sequences corresponding to n consecutive horizontal viewing angles that are adjacent to the horizontal viewing angle and less than the horizontal viewing angle, and viewing angle video sequences corresponding to m consecutive horizontal viewing angles that are adjacent to the horizontal viewing angle and greater than the horizontal viewing angle, n and m are both positive integers, and n+m≤N−1.

In another exemplary embodiment, the data decoding module 730 includes:

a first processing unit 731, configured to: decode encoded data that is received at a current moment and that is of an area in a viewing angle video sequence whose horizontal viewing angle matches the viewing angle, and play the obtained area; and buffer encoded data of n+m areas in the n+m viewing angle video sequences that is received at the current moment.

In another exemplary embodiment, the data decoding module 730 further includes:

a second processing unit 732, configured to: if the viewing angle of the user changes at a moment $T_i$, select encoded data of an $i^{th}$ area in an updated viewing angle video sequence from the encoded data of the n+m areas that is buffered by the first processing unit 731, decode the encoded data, and play the obtained $i^{th}$ area, where the updated viewing angle video sequence is a viewing angle video sequence whose horizontal viewing angle matches the changed viewing angle.

In another exemplary embodiment, the data decoding module 730 includes:

a third processing unit 733, configured to: decode encoded data that is received at a current moment and that is of an area in a viewing angle video sequence whose horizontal viewing angle matches the viewing angle, and play the obtained area; and decode encoded data of n+m areas in the n+m viewing angle video sequences that is received at the current moment, and buffer the obtained n+m areas.

In another exemplary embodiment, the data decoding module 730 further includes:

a fourth processing unit 734, configured to: if the viewing angle of the user changes at a moment $T_j$, select an $i^{th}$ area in an updated viewing angle video sequence from the n+m areas that are buffered by the third processing unit 733, and play the $i^{th}$ area, where the updated viewing angle video sequence is a viewing angle video sequence whose horizontal viewing angle matches the changed viewing angle.

In the video decoding apparatus provided in this exemplary embodiment, the viewing angle of the user is provided to the encoder, so that the encoder divides the panoramic video to N viewing angle video sequences, and encodes the N viewing angle video sequences respectively, to obtain N groups of encoded data. A viewing angle video sequence whose horizontal viewing angle includes the viewing angle is selected, and encoded data of the viewing angle video sequence is provided to the user. Transmission and decoding of encoded data of a viewing angle video sequence outside the viewing angle is avoided. This saves resources, and resolves the problem that receiving and decoding of all encoded data of a panoramic picture frame in a panoramic video causes resource waste.

Moreover, encoded data of each n+m areas that are in the n+m viewing angle video sequences and that belong to a same panoramic picture frame is sequentially received. The n+m viewing angle video sequences are viewing angle video sequences that are obtained by the encoder and that correspond to n consecutive horizontal viewing angles that are adjacent to the horizontal viewing angle and less than the horizontal viewing angle, and viewing angle video sequences that are obtained by the encoder and that correspond to m consecutive horizontal viewing angles that are adjacent to the horizontal viewing angle and greater than the horizontal viewing angle. The encoder provides encoded data of a viewing angle video sequence whose horizontal viewing angle is adjacent to the viewing angle to the user. In this way, when the viewing angle changes, the decoder may immediately obtain corresponding encoded data from the buffered encoded data. This implements smoother video playing, and resolves the problem of playing freeze caused by that when the viewing angle changes, the encoder needs to send encoded data of the viewing angle video sequence whose horizontal viewing angle matches the changed viewing angle to the decoder.

In the above-described exemplary embodiments, the modules such as the video obtaining module, the video division module, the video encoding module, the viewing angle determining module, and the first provision module included in the video encoding apparatus, and the units included in the modules may all be implemented by using a processor in the encoder. In the above-described exemplary embodiments, the modules such as the viewing angle provision module, the first receiving module, and the data decoding module included in the video decoding apparatus, and the units included in the modules may all be implemented by using a processor in the decoder. Certainly, functions implemented by the processor may further be implemented by using a logical circuit. In an implementation process, the processor may be a central processing unit (CPU), a microprocessor (MPU), a digital signal processor (DSP), a field programmable gate array (FPGA), and the like.

It should be noted that in the above-described exemplary embodiments, if the video encoding method is implemented in the form of a software functional module and sold or used as an independent product, the video encoding method may also be stored in a computer readable storage medium. Based on such an understanding, the technical solutions of the exemplary embodiments essentially, or the part contributing to the existing art may be implemented in a form of a software product. The computer software product is stored in a storage medium and includes several instructions for instructing a computer device (which may be a personal computer, a server, a network device, or the like) to perform all or some of the methods described in the exemplary embodiments. The foregoing storage medium includes: any medium that can store computer program code, such as a USB flash drive, a removable hard disk, a read only memory (ROM), a magnetic disk, or an optical disc. Therefore, the exemplary embodiments are not limited to any particular combination of hardware and software.

Correspondingly, an exemplary embodiment further provides a computer storage medium. The computer storage medium stores a computer executable instruction, and the computer executable instruction is used to execute the video encoding method provided in the above-described exemplary embodiments.

Correspondingly, an exemplary embodiment provides an encoder, including: a first storage medium configured to store an executable instruction and a first processor, the first processor being configured to execute the stored executable instruction, and the executable instruction being used to perform the following steps:

obtaining a panoramic video, the panoramic video being formed by panoramic picture frames, and the panoramic picture frame being a picture frame formed to record a scenery of a preset viewing angle;

dividing the panoramic video to N viewing angle video sequences, each viewing angle video sequence being formed by areas that are in the panoramic picture frames and that have a same horizontal viewing angle, the sum of horizontal viewing angles of the N viewing angle video sequences being a total horizontal viewing angle of the panoramic picture frames, N being a positive integer, and areas of the panoramic picture frame not overlapping with each other;

encoding the N viewing angle video sequences respectively to obtain N groups of encoded data;

determining a viewing angle of a user; and selecting a viewing angle video sequence whose horizontal viewing angle includes the viewing angle, and providing encoded data of the viewing angle video sequence to the user.

Correspondingly, an exemplary embodiment provides an encoding and decoding system, the system including an encoder and a decoder. The encoder includes: a first storage medium configured to store an executable instruction and a first processor, the first processor being configured to execute the stored executable instruction, and the executable instruction being used to perform the following steps:

obtaining a panoramic video, the panoramic video being formed by panoramic picture frames, and the panoramic picture frame being a picture frame formed to record a scenery of a preset viewing angle;

dividing the panoramic video to N viewing angle video sequences, each viewing angle video sequence being formed by areas that are in the panoramic picture frames and that have a same horizontal viewing angle, the sum of horizontal viewing angles of the N viewing angle video sequences being a total horizontal viewing angle of the panoramic picture frames, N being a positive integer, and areas of the panoramic picture frame not overlapping with each other;

encoding the N viewing angle video sequences respectively to obtain N groups of encoded data;

determining a viewing angle of a user; and selecting a viewing angle video sequence whose horizontal viewing angle includes the viewing angle, and providing encoded data of the viewing angle video sequence to the user.

The decoder includes: a second storage medium configured to store an executable instruction and a second processor, the second processor being configured to execute the stored executable instruction, and the executable instruction being used to perform the following steps:

providing a viewing angle of a user to an encoder, the encoder being configured to obtain a panoramic video, the panoramic video being formed by a panoramic picture frames, and the panoramic picture frame being a picture frame formed to record a scenery of a preset viewing angle; dividing the panoramic video to N viewing angle video sequences; encoding the N viewing angle video sequences respectively to obtain N groups of encoded data; and selecting a viewing angle video sequence whose horizontal viewing angle includes the viewing angle, and providing encoded data of the viewing angle video sequence to the user, each viewing angle video sequence being formed by all areas that are in the panoramic picture frames of the panoramic video and that have a same horizontal viewing angle, the sum of horizontal viewing angles of the N viewing angle video sequences being a total horizontal viewing angle of the panoramic picture frames, N being a positive integer, and areas of the panoramic picture frame not overlapping with each other;

receiving the encoded data sent by the encoder; and
decoding the encoded data.

It should be noted that division of the foregoing functional modules is only described for exemplary purposes when the video encoding apparatus provided in the foregoing exemplary embodiment encodes a video. In an actual application, the foregoing functions may be allocated to be accomplished by different functional modules according to requirements, that is, the internal structure of the video encoding apparatus is divided into different functional modules, to accomplish all or a part of the above described functions. Moreover, the exemplary embodiments of the video encoding apparatus provided in the foregoing exemplary embodiments belong to the same idea as that of the exemplary embodiments of the video encoding method. For details of a specific implementation process thereof, refer to the method exemplary embodiments. Details are not described herein again.

The sequence numbers of the exemplary embodiments are merely for description purpose but do not indicate the preference of the exemplary embodiments.

A person of ordinary skill in the art may understand that all or some of the steps of the foregoing exemplary embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely exemplary embodiments, but are not intended to limit the present disclosure. Any modification, equivalent replacement, or improvement made within the spirit and principle of the present disclosure shall fall within the protection scope of the present disclosure.

What is claimed is:

1. A method comprising:

obtaining, by at least one central processing unit (CPU), a panoramic video, the panoramic video being formed by a plurality of panoramic picture frames, each of the plurality of panoramic picture frames being a picture frame formed to record a scenery of a viewing angle;

dividing, by the at least one CPU, the panoramic video into N viewing angle video sequences, each viewing angle video sequence being formed by areas that are in the plurality of panoramic picture frames, that do not overlap with each other, and that have a same horizontal viewing angle, the sum of the horizontal viewing angles of the N viewing angle video sequences being a total horizontal viewing angle of the panoramic picture frame, N being a positive integer;

encoding, respectively by the at least one CPU, the N viewing angle video sequences to obtain N respective groups of encoded data;

determining, by the at least one CPU, a viewing angle; and selecting, by the at least one CPU, a viewing angle video sequence, from among the N viewing angle video sequences, whose horizontal viewing angle comprises the determined viewing angle, and transmitting only encoded data of the selected viewing angle video sequence, wherein the method further comprises:

in response to determining, at a moment $T_i$, that the viewing angle changes, skipping, by the at least one CPU, transmitting encoded data of an $i^{th}$ area in the viewing angle video sequence, where i is a positive integer;

selecting, by the at least one CPU, an updated viewing angle video sequence, and transmitting encoded data of an $i^{th}$ area in the updated viewing angle video sequence to the user, wherein the updated viewing angle video sequence is a viewing angle video sequence whose horizontal viewing angle matches the changed viewing angle; and updating, by the at least one CPU, i to i+1, and cyclically performing the step of transmitting encoded data of an $i^{th}$ area in the updated viewing angle video sequence to the user at the moment $T_i$, wherein macroblocks of adjacent areas in the plurality of picture frames are encoded such that the macroblocks of adjacent areas are not dependent on each other.

2. The method according to claim 1, wherein the dividing the panoramic video to N viewing angle video sequences comprises:

dividing, by the at least one CPU, each panoramic picture frame of the panoramic video to N areas according to a viewing angle division rule and the horizontal viewing angle; and obtaining, by the at least one CPU, the N viewing angle video sequences by, for each video angle video sequence, combining all areas of the plurality of panoramic picture frames that have the same horizontal viewing angle to form the video angle video sequence.

3. The method according to claim 1, wherein the method further comprises, after the selecting the viewing angle video sequence:

obtaining, by the at least one CPU, viewing angle video sequences corresponding to n consecutive horizontal viewing angles that are adjacent to the horizontal viewing angle and less than the horizontal viewing angle; and obtaining viewing angle video sequences corresponding to m consecutive horizontal viewing angles that are adjacent to the horizontal viewing angle and greater than the horizontal viewing angle, wherein n and m are both positive integers, and n+m≤N−1; and sequentially transmitting, by the at least one CPU, encoded data of each n+m areas that are in the n+m viewing angle video sequences and that belong to a same panoramic picture frame.

4. The method according to claim 1, wherein in each viewing angle video sequence, encoded data of a $j^{th}$ area is generated according to encoded data of a $(j−1)^{th}$ area; or encoded data of a $j^{th}$ area is generated according to encoded data of a $(j−1)^{th}$ area and encoded data of an $l^{th}$ area, where j and l are both positive integers, and l>j≥2; and encoded data of any two areas of different viewing angle video sequences are irrelevant in a time domain.

5. The method according to claim 1, wherein, for each area of the areas that comprises at least two macroblocks, encoded data of a first macroblock of the at least two macroblocks is generated according to encoded data of a second macroblock of the at least two macroblocks that is adjacent to the first macroblock in a space domain; and encoded data of two macroblocks that are of different areas and that are adjacent in a space domain is irrelevant.

6. A method comprising:

transmitting, by at least one central processing unit (CPU), a viewing angle to an encoder;

receiving, by the at least one CPU, encoded data from the encoder, the encoded data being of only a viewing angle video sequence selected from among N viewing angle video sequences according to the viewing angle that was transmitted, each of the N viewing angle video sequences formed by areas that are in a plurality of panoramic picture frames that comprise a panoramic video, that do not overlap with each other, and that have a same horizontal viewing angle, the sum of the horizontal viewing angles of the N viewing angle video sequences being a total horizontal viewing angle of the panoramic picture frame, N being a positive integer; and decoding, by the at least one CPU, the encoded data that is received;

sequentially receiving, by the at least one CPU, encoded data of each of n+m areas that are in n+m viewing angle video sequences and that belong to a same panoramic picture frame, wherein the n+m viewing angle video sequences are viewing angle video sequences corresponding to n consecutive horizontal viewing angles that are adjacent to the horizontal viewing angle and less than the horizontal viewing angle, and viewing angle video sequences corresponding to m consecutive horizontal viewing angles that are adjacent to the horizontal viewing angle and greater than the horizontal viewing angle, n and m are both positive integers, and n+m≤N−1, and in response to determining that the viewing angle changes at a moment $T_i$:

selecting, by the at least one CPU, encoded data of an $i^{th}$ area in an updated viewing angle video sequence from the buffered encoded data of the n+m areas, decoding the encoded data that is selected, and playing the obtained $i^{th}$ area, wherein the updated viewing angle video sequence is a viewing angle video sequence whose horizontal viewing angle matches the changed viewing angle, and wherein macroblocks of adjacent areas in the plurality of picture frames are encoded such that the macroblocks of adjacent areas are not dependent on each other.

7. The method according to claim 6, wherein the decoding the encoded data comprises:

decoding, by the at least one CPU, encoded data that is received at a current moment and that is of an area in a viewing angle video sequence whose horizontal viewing angle matches the viewing angle, and playing the obtained area; and buffering, by the at least one CPU, encoded data of n+m areas in the n+m viewing angle video sequences that is received at the current moment.

8. The method according to claim 6, wherein the decoding the encoded data comprises:

decoding, by the at least one CPU, encoded data that is received at a current moment and that is of an area in a viewing angle video sequence whose horizontal viewing angle matches the viewing angle, and playing the obtained area; and decoding, by the at least one CPU, encoded data of n+m areas in the n+m viewing angle video sequences that is received at the current moment, and buffering the obtained n+m areas.

9. The method according to claim 8, wherein the method further comprises, in response to determining that the viewing angle changes at a moment $T_1$:

selecting, by the at least one CPU, an $i^{th}$ area in an updated viewing angle video sequence from the buffered n+m areas, and playing the $i^{th}$ area, wherein the updated viewing angle video sequence is a viewing angle video sequence whose horizontal viewing angle matches the changed viewing angle.

10. An apparatus comprising:

at least one memory configure to store computer program code; and at least one processor configured to access the at least one memory and operate according to the computer program code, the program code comprising:

video obtaining code configured to cause at least one of said at least one processor to obtain a panoramic video, the panoramic video being formed by a plurality of panoramic picture frames, each of the plurality of panoramic picture frames being a picture frame formed to record a scenery of a viewing angle;

video division code configured to cause at least one of said at least one processor to divide the panoramic video into N viewing angle video sequences, each viewing angle video sequence being formed by areas that are in the plurality of panoramic picture frames, that do not overlap with each other, and that have a same horizontal viewing angle, the sum of the horizontal viewing angles of the N viewing angle video sequences being a total horizontal viewing angle of the panoramic picture frame, N being a positive integer;

video encoding code configured to cause at least one of said at least one processor to encode, respectively, the N viewing angle video sequences to obtain N respective groups of encoded data;

viewing angle determining code configured to cause at least one of said at least one processor to determine a viewing angle; and first provision code configured to cause at least one of said at least one processor to select a viewing angle video sequence, from among the N viewing angle video sequences, whose horizontal viewing angle comprises the determined viewing angle, and transmit only encoded data of the selected viewing angle video sequence, wherein the first provision code is further configured to:

in response to determining, at a moment $T_i$, that the viewing angle changes, skip transmitting encoded data of an $i^{th}$ area in the viewing angle video sequence, where i is a positive integer;

select an updated viewing angle video sequence, and transmit encoded data of an $i^{th}$ area in the updated viewing angle video sequence to the user, wherein the updated viewing angle video sequence is a viewing angle video sequence whose horizontal viewing angle matches the changed viewing angle; and update i to i+1, and cyclically transmit encoded data of an $i^{th}$ area in the updated viewing angle video sequence to the user at the moment $T_i$, wherein macroblocks of adjacent areas in the plurality of picture frames are encoded such that the macroblocks of adjacent areas are not dependent on each other.

11. The apparatus according to claim 10, wherein the video division code comprises:

area division code configured to cause at least one of said at least one processor to divide each panoramic picture frame of the panoramic video to N areas according to a viewing angle division rule and the horizontal viewing angle; and sequence generation code configured to cause at least one of said at least one processor to obtain the N viewing angle video sequences by, for each video angle video sequence, combining all areas of the plurality of panoramic picture frames that have the same horizontal viewing angle to form the video angle video sequence.

12. The apparatus according to claim 10, wherein the apparatus further comprises:

sequence selection code configured to cause at least one of said at least one processor to, after the selecting the viewing angle video sequence:

obtain viewing angle video sequences corresponding to n consecutive horizontal viewing angles that are adjacent to the horizontal viewing angle and less than the horizontal viewing angle; and obtain viewing angle video sequences corresponding to m consecutive horizontal viewing angles that are adjacent to the horizontal viewing angle and greater than the horizontal viewing angle, wherein n and m are both positive integers, and n+m≤N−1; and second provision code configured to cause at least one of said at least one processor to sequentially transmit encoded data of each n+m areas that are in the n+m viewing angle video sequences and that belong to a same panoramic picture frame.

13. The apparatus according to claim 10, wherein in each viewing angle video sequence, encoded data of a $j^{th}$ area is generated according to encoded data of a $(j-1)^{th}$ area; or encoded data of a $j^{th}$ area is generated according to encoded data of a $(j-1)^{th}$ area and encoded data of an $l^{th}$ area, wherein j and l are both positive integers, and l>j≥2; and encoded data of any two areas of different viewing angle video sequences are irrelevant in a time domain.

14. The apparatus according to claim 10, wherein, for each area of the areas that comprises at least two macroblocks, encoded data of a first macroblock of the at least two macroblocks is generated according to encoded data of a second macroblock of the at least two macroblocks that is adjacent to the first macroblock in a space domain; and encoded data of two macroblocks that are of different areas and that are adjacent in a space domain is irrelevant.

15. An apparatus comprising:

at least one memory configure to store computer program code; and at least one processor configured to access the at least one memory and operate according to the computer program code, the program code comprising:

viewing angle provision code configured to cause at least one of said at least one processor to transmit a viewing angle to an encoder;

first receiving code configured to cause at least one of said at least one processor to receive encoded data from the encoder, the encoded data being of only a viewing angle video sequence selected from among N viewing angle video sequences according to the viewing angle that was transmitted, each of the N viewing angle video sequences formed by areas that are in a plurality of panoramic picture frames that comprise a panoramic video, that do not overlap with each other, and that have a same horizontal viewing angle, the sum of the horizontal viewing angles of the N viewing angle video sequences being a total horizontal viewing angle of the panoramic picture frame, N being a positive integer; and data decoding code configured to cause at least one of said at least one processor to decode the encoded data that is received, wherein the program code further comprises:

second receiving code configured to cause at least one of said at least one processor to sequentially receive encoded data of each of n+m areas that are in n+m viewing angle video sequences and that belong to a same panoramic picture frame, wherein the n+m viewing angle video sequences are viewing angle video sequences corresponding to n consecutive horizontal viewing angles that are adjacent to the horizontal viewing angle and less than the horizontal viewing angle, and viewing angle video sequences corresponding to m consecutive horizontal viewing angles that are adjacent to the horizontal viewing angle and greater than the horizontal viewing angle, n and m are both positive integers, and n+m≤N−1, and wherein the data decoding code further comprises:

second processing code receiving code configured to cause at least one of said at least one processor to, in response to determining that the viewing angle changes at a moment $T_i$:

select encoded data of an $i^{th}$ area in an updated viewing angle video sequence from the buffered encoded data of the n+m areas, decode the encoded data that is selected, and play the obtained i<sup>th</sup> area, wherein the updated viewing angle video sequence is a viewing angle video sequence whose horizontal viewing angle matches the changed viewing angle, wherein macroblocks of adjacent areas in the plurality of picture frames are encoded such that the macroblocks of adjacent areas are not dependent on each other.

16. The apparatus according to claim 15, wherein the data decoding code comprises:

first processing code receiving code configured to cause at least one of said at least one processor to decode encoded data that is received at a current moment and that is of an area in a viewing angle video sequence whose horizontal viewing angle matches the viewing angle, and play the obtained area; and buffer encoded data of n+m areas in the n+m viewing angle video sequences that is received at the current moment.

17. The apparatus according to claim 15, wherein the data decoding code comprises:

third processing code receiving code configured to cause at least one of said at least one processor to:

decode encoded data that is received at a current moment and that is of an area in a viewing angle video sequence whose horizontal viewing angle matches the viewing angle, and play the obtained area; and decode encoded data of n+m areas in the n+m viewing angle video sequences that is received at the current moment, and buffering the obtained n+m areas.

18. The apparatus according to claim 17, wherein the data decoding code further comprises:

fourth processing code receiving code configured to cause at least one of said at least one processor to, in response to determining that the viewing angle changes at a moment $T_j$:

select an i<sup>th</sup> area in an updated viewing angle video sequence from the buffered n+m areas, and playing the i<sup>th</sup> area, wherein the updated viewing angle video sequence is a viewing angle video sequence whose horizontal viewing angle matches the changed viewing angle.

19. A non-transitory computer readable storage medium storing computer program code that, when executed by a computer, causes the computer to perform:

transmitting a viewing angle to an encoder;

receiving encoded data from the encoder, the encoded data being of only a viewing angle video sequence selected from among N viewing angle video sequences according to the viewing angle that was transmitted, each of the N viewing angle video sequences formed by areas that are in a plurality of panoramic picture frames that comprise a panoramic video, that do not overlap with each other, and that have a same horizontal viewing angle, the sum of the horizontal viewing angles of the N viewing angle video sequences being a total horizontal viewing angle of the panoramic picture frame, N being a positive integer;

decoding the encoded data that is received;

sequentially receiving, by the at least one CPU, encoded data of each of n+m areas that are in n+m viewing angle video sequences and that belong to a same panoramic picture frame, wherein the n+m viewing angle video sequences are viewing angle video sequences corresponding to n consecutive horizontal viewing angles that are adjacent to the horizontal viewing angle and less than the horizontal viewing angle, and viewing angle video sequences corresponding to m consecutive horizontal viewing angles that are adjacent to the horizontal viewing angle and greater than the horizontal viewing angle, n and m are both positive integers, and n+m≤N−1, and in response to determining that the viewing angle changes at a moment $T_j$:

selecting, by the at least one CPU, encoded data of an i<sup>th</sup> area in an updated viewing angle video sequence from the buffered encoded data of the n+m areas, decoding the encoded data that is selected, and playing the obtained i<sup>th</sup> area, wherein the updated viewing angle video sequence is a viewing angle video sequence whose horizontal viewing angle matches the changed viewing angle, and wherein macroblocks of adjacent areas in the plurality of picture frames are encoded such that the macroblocks of adjacent areas are not dependent on each other.

20. An encoder comprising:

at least one memory configure to store computer program code; and at least one processor configured to access the at least one memory and operate according to the computer program code, the program code comprising:

video obtaining code configured to cause at least one of said at least one processor to obtain a panoramic video, the panoramic video being formed by a plurality of panoramic picture frames, each of the plurality of panoramic picture frames being a picture frame formed to record a scenery of a viewing angle;

video division code configured to cause at least one of said at least one processor to divide the panoramic video into N viewing angle video sequences, each viewing angle video sequence being formed by areas that are in the plurality of panoramic picture frames, that do not overlap with each other, and that have a same horizontal viewing angle, the sum of the horizontal viewing angles of the N viewing angle video sequences being a total horizontal viewing angle of the panoramic picture frame, N being a positive integer;

video encoding code configured to cause at least one of said at least one processor to encode, respectively, the N viewing angle video sequences to obtain N respective groups of encoded data;

viewing angle determining code configured to cause at least one of said at least one processor to determine a viewing angle; and first provision code configured to cause at least one of said at least one processor to select a viewing angle video sequence, from among the N viewing angle video sequences, whose horizontal viewing angle comprises the determined viewing angle, and transmit only encoded data of the selected viewing angle video sequence, wherein the first provision code is further configured to:

in response to determining, at a moment $T_j$, that the viewing angle changes, skip transmitting encoded data of an i<sup>th</sup> area in the viewing angle video sequence, where i is a positive integer;

select an updated viewing angle video sequence, and transmit encoded data of an i<sup>th</sup> area in the updated viewing angle video sequence to the user, wherein the updated viewing angle video sequence is a viewing angle video sequence whose horizontal viewing angle matches the changed viewing angle; and update i to i+1, and cyclically transmit encoded data of an $i^{th}$ area in the updated viewing angle video sequence to the user at the moment $T_j$, wherein macroblocks of adjacent areas in the plurality of picture frames are encoded such that the macroblocks of adjacent areas are not dependent on each other.

21. A method comprising:

obtaining, by at least one central processing unit (CPU), a panoramic video formed by a plurality of panoramic picture frames, each of the plurality of panoramic picture frames formed to record a scenery of a panoramic viewing angle;

dividing, by the at least one CPU, the panoramic video into N viewing angle video sequences, each of the N viewing angle video sequences having a viewing angle that is a non-overlapping subset of the panoramic viewing angle, wherein a sum of the viewing angles of the N viewing angle video sequences totals the panoramic viewing angle, N being a positive integer;

encoding, by the at least one CPU, the N viewing angle video sequences;

determining, by the at least one CPU, a viewing angle;

selecting, by the at least one CPU, a viewing angle video sequence, from among the N viewing angle video sequences, whose horizontal viewing angle comprises the determined viewing angle; and transmitting, by the at least one CPU, only encoded data of the selected viewing angle video sequence, wherein the method further comprises:

in response to determining, at a moment $T_j$, that the viewing angle changes, skipping, by the at least one CPU, transmitting encoded data of an $i^{th}$ area in the viewing angle video sequence, where i is a positive integer;

selecting, by the at least one CPU, an updated viewing angle video sequence, and transmitting encoded data of an $i^{th}$ area in the updated viewing angle video sequence to the user, wherein the updated viewing angle video sequence is a viewing angle video sequence whose horizontal viewing angle matches the changed viewing angle; and updating, by the at least one CPU, i to i+1, and cyclically performing the step of transmitting encoded data of an $i^{th}$ area in the updated viewing angle video sequence to the user at the moment $T_j$, wherein macroblocks of adjacent areas in the plurality of picture frames are encoded such that the macroblocks of adjacent areas are not dependent on each other.

* * * * *